Figure 1:
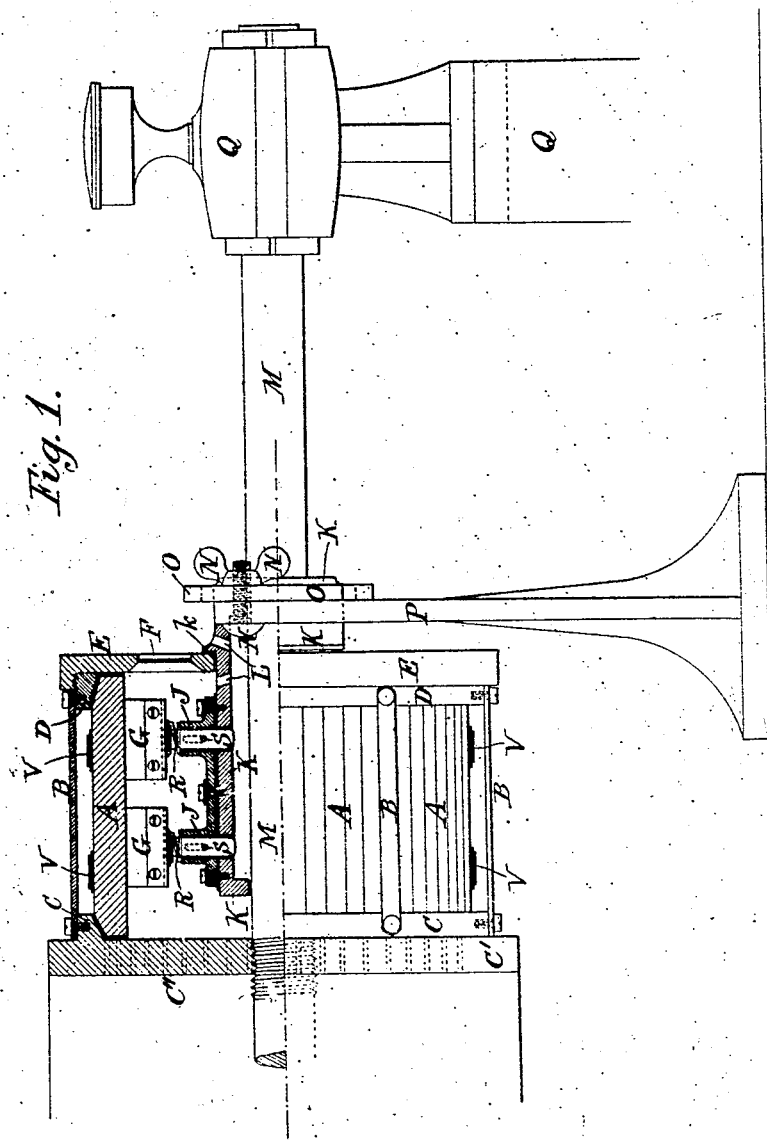

(No Model.) 2 Sheets—Sheet 1.

H. DAVIS & A. H. STOKES.
COMMUTATOR FOR DYNAMO ELECTRIC GENERATORS AND MOTORS.

No. 453,858. Patented June 9, 1891.

Witnesses:

Inventors:
Henry Davis
Arthur Henry Stokes
By ____ Attorney

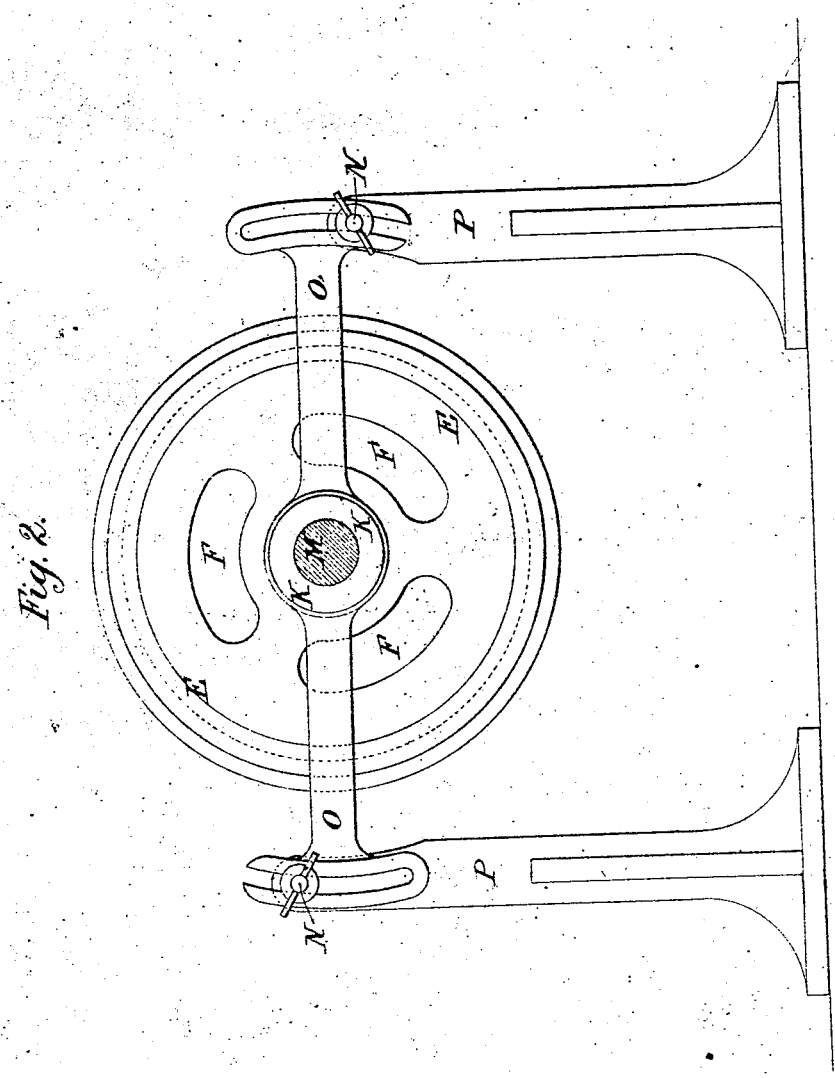

UNITED STATES PATENT OFFICE.

HENRY DAVIS AND ARTHUR HENRY STOKES, OF DERBY, ENGLAND.

COMMUTATOR FOR DYNAMO-ELECTRIC GENERATORS AND MOTORS.

SPECIFICATION forming part of Letters Patent No. 453,858, dated June 9, 1891.

Application filed December 11, 1890. Serial No. 374,401. (No model.)

*To all whom it may concern:*

Be it known that we, HENRY DAVIS and ARTHUR HENRY STOKES, both subjects of the Queen of Great Britain, residing at Derby, in the county of Derby, England, have invented an Improved Commutator for Dynamo-Electric Generators and Motors, of which the following is a specification.

This invention relates to a commutator for dynamo-electric generators and motors in which the surrounding atmosphere is excluded from the commutator bars and brushes, so that when working in a gas-impregnated atmosphere danger of explosion from sparking will be avoided, and the brushes will be efficiently protected from the damaging and disturbing effects of weather, dust, &c.

In the accompanying drawings, Figure 1 is partly a side elevation and partly a longitudinal section of a commutator embodying our invention; and Fig. 2 an end view thereof, showing the means employed for adjusting the lead of the brushes.

A suitable method of carrying the invention into effect consists in clamping the commutator-bars A between rings C D, which bear on the ends of the bars, such rings being connected together by tie-bars B. The commutator-bars A are insulated from each other and from the rings C D. The inner clamping-ring C is attached to or forms part of a circular plate C', which screws onto the commutator-shaft M, while an end plate E screws onto the outer ring D and has a central opening through which a sleeve-cylinder K, carrying the brushes G, projects to the inside of the commutator-ring. This end plate E is preferably provided with openings F, in which horn, glass, or other transparent material is inserted, so as to form windows for enabling the commutator and brushes to be inspected during working while preventing the admission of gases or dust.

The sleeve-cylinder K, carrying the brushes G, surrounds the commutator-shaft M, with which it forms a loose but nearly tight-fitting joint at its ends, and the part outside the commutator-ring is provided with a flange k, which also forms a loose but nearly tight-fitting joint against the outer surface of the end plate E round the opening therein, through which such sleeve-cylinder projects to the inside of the commutator-ring.

The brush-holders J are carried by and insulated from the sleeve-cylinder K, the latter being pierced with a hole or holes L from the brushes to the outside of the commutator-ring for the passage of the leads to the brushes. The brushes G, carried in the holders J, are forced outward by springs R, so as to bear against the inner surface of the cylindrical ring formed by the commutator-bars A, a pin-and-slot connection S serving to guide the brushes in such movement.

The sleeve-cylinder K, carrying the brush-holders J, has arms O projecting from its outer end, such arms serving to regulate the lead of the brushes by adjusting the ends of such arms within brackets P, which they engage, (thereby shifting the sleeve-cylinder round the shaft,) and then by means of clamping-screws N securing such such arms in the position to which they have been adjusted.

By unscrewing the end plate E from the outer clamping-ring D and releasing the ends of the arms O of the sleeve-cylinder K from the brackets P they engage, the sleeve-cylinder K can be slid along the shaft, thus drawing out the brushes G from the inside of the commutator-ring when required for cleaning or repairing the same, a sufficient space being left between the end plate E and the end bearing Q of the commutator-shaft M to enable this to be effected. As the end plate E is secured to the ring D of the commutator and revolves with it, and the brushes cannot be removed until the plate E is unfastened from such ring, it will be seen that this cannot be effected while the machine is running; and, further, it will be seen that the plate E must be again secured to the ring D before the machine can be again run. It therefore follows that the commutator and brushes cannot be exposed or opened to the atmosphere while the motor is running, and all chance of an explosion occurring is consequently avoided.

If required, binding wires or strips V, insulated from the commutator-bars A, may be wound outside the ring of such bars, so as to give greater stability to such ring.

What we claim as our invention, and desire to secure by Letters Patent, is—

1. The improved commutator, consisting of a set of insulated commutator-bars arranged in the form of a cylindrical ring closed at both ends, and of brushes bearing against the inner surface of such ring and carried by a sleeve projecting through an opening in the plate closing the outer end of the ring, the sleeve passing through the outer plate, so that it can be turned in relation thereto and yet form a flame-tight and dust-tight joint at the opening through which it passes, substantially as described.

2. The combination of a commutator-shaft, a commutator-cylinder supported thereon, a sleeve on said shaft within said cylinder, brushes supported on said sleeve and bearing against the inner surface of the commutator-cylinder, an arm projecting from said sleeve outside said cylinder, and a bracket engaged by said arm, substantially as described.

3. The combination of a commutator-shaft, a commutator-cylinder supported thereon, a sleeve on said shaft within said cylinder, brushes supported on said sleeve and bearing against the inner surface of the commutator-cylinder, an arm projecting from said sleeve outside said cylinder, a bracket engaged by said arm, and means for adjusting said arm on said bracket, substantially as described.

4. The combination of a commutator-shaft, a commutator-cylinder supported thereon, a sliding sleeve on said shaft within said cylinder, brushes supported on said sleeve for contact with the inner surface of the cylinder, and plates closing the ends of said cylinder, one of said plates being detachable, substantially as described.

5. The combination, with a cylindrical ring of insulated commutator-bars, and brushes which bear on the inner surface of such ring of bars, of end plates to close the ends of such ring, substantially as and for the purpose specified.

6. The combination, with the ring of commutator-bars A and the sleeve K, carrying brushes G, bearing on the inner surface of such ring, of arms O, projecting from such sleeve K outside the ring of commutator-bars and engaging brackets P, their positions in such brackets being adjustable, so as to regulate the lead of the brushes, substantially as specified.

HENRY DAVIS.
ARTHUR HENRY STOKES.

Witnesses:
T. M. WINSTANLEY WALLIS,
   *Derby, Engineer.*
WILLIAM HY. EVANS,
   *49 Wild St., Derby, Clerk.*